Dec. 13, 1949  H. HEIMANN  2,491,310
RETAINING RING
Filed June 17, 1946

Inventor
Heinrich Heimann,
By [signature]
Attorney

Patented Dec. 13, 1949

2,491,310

UNITED STATES PATENT OFFICE 2,491,310

RETAINING RING

Heinrich Heimann, New York, N. Y., assignor to Waldes Koh-I-Noor, Inc., New York, N. Y., a corporation of New York Application June 17, 1946, Serial No. 677,375

7 Claims. (Cl. 85—8.5)

This invention relates to improvements in retaining rings of the type adapted to be sprung into a seating groove provided therefor in a shaft, pin or the like and to provide thereon an artificial shoulder capable of securing a machine part against axial displacement relative to the shaft or pin.

As usually constructed, retaining rings of the character to which the invention pertains take the form of a substantially closed split ring or annulus, the width of the gap between the free ends thereof being as small as possible for convenient assembly and disassembly. Rings of this type are applied by being spread over a free end of the shaft or pin, being thereupon shifted axially therealong to the plane of the seating groove into which they are sprung. Such rings are preferably designed to have an inner diameter which is somewhat less than that of the bottom of the groove, so that the rings pressure-fit themselves into their grooves.

To insure that the rings deform circularly as they are expanded when being applied, and also that they embrace the groove bottom throughout their entire circumference when seated, such rings according to modern design are formed with a continuous taper, i. e. with a diminishing section height from their middle sections to their free ends, as disclosed by United States Reissue Patent No. 18,144, dated August 4, 1931, and are moreover conventionally provided at their free ends with apertured lugs or ears to facilitate their assembly and disassembly with a plier-like tool. While tapered rings are highly efficient in the majority of cases, there are ring applications in which they meet with the objection that, because of their taper, they protrude unequally from the shaft and thus form a non-uniform depth of shoulder.

Stated generally, the present invention aims to provide an external retaining ring which possesses the known advantages of the tapered ring but which additionally provides a uniform depth of shoulder throughout its full arcuate length. More specifically, the invention provides an improved retaining ring of the substantially closed type, which is capable of exerting a firm pressure grip against the bottom of its seating groove, which maintains circularity under deformation, i. e. upon being spread in assembly and disassembly and when seated against a groove bottom of diameter slightly in excess of the normal or unstressed diameter of the ring and which is moreover capable of forming a uniform depth of shoulder throughout its full arcuate length.

In another of its aspects, the invention contemplates and provides a retaining ring as aforesaid having a median diameter which is greater than that of conventional retaining rings, whereby for the same depth of seating groove the present ring need be spread by a smaller amount (percentage) in assembly than the conventional ring, or whereby the present ring may be spread to the same amount as heretofore in its assembly in a groove of increased depth as compared to the depth of a groove required for the conventional ring.

The above and other objects and advantages will appear from the following detailed description of the invention, taken with the accompanying drawing, in which—

Figure 1:
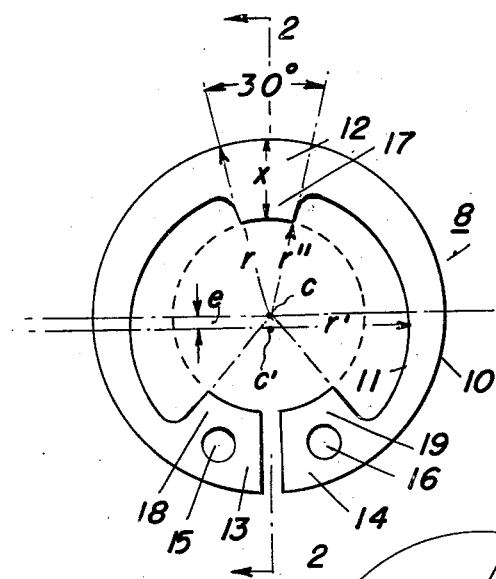
Fig. 1 is a plan view of a retaining ring according to this invention.
Figure 2:
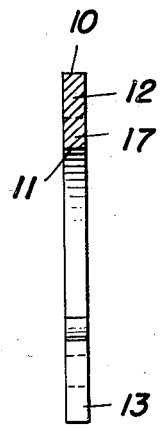
Fig. 2 is a vertical section taken on line 2—2 of Fig. 1.

In the drawings, reference character 8 designates generally a ring body in the form of an open-ended annulus made from spring metal, preferably spring steel. The outer or shoulder forming edge 10 of the ring extends throughout its full arcuate length along a circular arc of constant radius $r$ from the ring center C. The inner edge 11 of the ring is also circular but is eccentric to the outer edge 10, being formed with radius $r'$ from center C, the eccentricity $e$ between centers being in the direction of the ring opening. Accordingly, the ring tapers from its middle section 12 of greatest section height towards the free ends 13, 14 thereof, which latter are provided with apertures 15, 16 to facilitate handling of the ring with a plier-like tool.

As seen in Fig. 1, the ring is provided in its middle portion with an inwardly directed protrusion or lug 17, and the free ends of the ring are formed with similar inwardly directed projections or lugs 18, 19, all three of which project well within the circle of the inner edge 11 of the ring. The inner edges of the lugs 17, 18 and 19 are formed as arcs of a common circle of radius $r''$ struck from center C, and hence the lug edges are concentric with the outer circular edge 10 of the ring body. While the length of the arcs described by the inner edges of the lugs 17, 18, 19 is appreciable, being such that the lugs bear with a firm pressure grip circumferentialwise against the bottom of the groove into which the ring is sprung, it will be observed that the arcuate length of the lug edges is substantially less than the arcuate length of the ring body between middle and end lugs, thus insuring that the ring may deform circularly as intended.

According to the invention, the center C of the outer circular edge of the ring coincides with the center of the shaft to which the ring will be applied. Inasmuch as the inner circular edges of the lugs 17, 18 and 19 are concentric with the outer edge, such edges are also concentric with the outer circle of the shaft, and also with the circle of the bottom of the shaft groove in which the ring is to be sprung. Accordingly, the ring is adapted to provide a uniform depth of shaft shoulder throughout its full arcuate length.

To insure pressure fit of the ring against the bottom of the groove, the ring design contemplates that the radius $r''$ of the circle on which lie the inner arcuate edges of the lugs or protrusions 17, 18, 19 is slightly less than the radius of the circle of the groove bottom. Hence, the ring is slightly stressed (expanded) when seated, with the concentric relation of the inner to outer ring edges insuring that the ring maintains circularity when seated even though slightly stressed as aforesaid. To further insure firm seating of the ring in its groove, the lugs 17, 18 and 19 are designed to have substantial arcuate length, the inner edge of the lug 17 subtending an arc of the order of 30°, and the inner edges of the lugs 18, 19 each subtending an arc of approximately 40°. Accordingly, upon the ring being sprung into its shaft groove, it firmly grips against the bottom of the ring groove with pressure fit.

In addition to providing a uniform depth shoulder throughout its full arcuate length, and the desirable pressure fit against the groove bottom, a ring according to the invention has the additional feature of advantage that its median diameter may be substantially larger than is possible with conventional retaining rings, wherein the median diameter equals approximately the shaft diameter. Inasmuch as the larger the median diameter, the smaller the percentage that the rings must be spread at its inner diameter to be shifted over its shaft (such being according to the ratio of inner diameter to median diameter), a ring according to the invention may be assembled in its shaft groove of the same depth as is conventional with a smaller percentage of spreading that was possible with the prior rings. If, on the other hand, the improved ring is spread by the same percentage as heretofore, the depth of the ring seating groove may be increased accordingly, which feature is of advantage in achieving firm and secure seating of the ring in assemblies wherein the ring is subjected to vibration and high impact forces.

Moreover, as the distance $x$ between the outer circular edge 10 of the ring and the inner edges of the segmental lugs 17, 18 and 19 is substantially independent of the seating and holding properties of a ring according to the invention, this distance may be chosen to be as large as desired for a particular ring application whereby a shoulder of depth greatly exceeding that obtainable with the conventional rings is provided, without the ring losing its other advantages as set forth herein.

Figure 3:
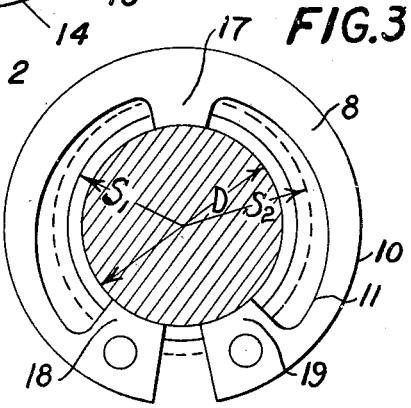
Fig. 3 is a section taken through a shaft with the improved retaining ring assembled thereon, the view illustrating the advantages resulting from the increased median diameter of the ring.

The aforesaid advantages achieved by a ring having relatively large median diameter as compared to conventional tapered rings will be seen from an analysis of Fig. 3, wherein the improved ring 8 of the invention is shown assembled on a shaft of diameter $S_1$ in a groove having diameter D. It will be observed that by virtue of the large median diameter of ring 8, it forms a shoulder which is substantially deeper than is possible of attainment with prior tapered ring. Also, the same ring may be assembled on a shaft of diameter $S_2$, in which case the depth of groove, i. e. difference between diameters $S_2$ and D, is relatively greater than is possible with the prior tapered rings.

As many changes could be made in carrying out the above construction without departing from the scope of the invention, it is intended that all matter contained in the above description or shown in the accompanying drawing shall be interpreted as illustrative and not in a limiting sense.

I claim:

1. An open-ended external retaining ring adapted to be sprung into a seating groove provided in a shaft, pin and the like, and to provide an artificial shaft or pin shoulder, comprising a substantially closed ring body having outer and inner circular edges which are eccentrically disposed so that the section height of the ring body decreases progressively from its middle portion towards its free ends whereby the ring body is adapted to maintain circularity under deformation, and protrusions extending inwardly of said inner edge at only the free ends and the middle portion of the ring body, the inner edges of said protrusions being formed as arcs of a circle which is concentric with the outer circular edge of the ring body, and said arcs having appreciable length so as to exert a firm pressure grip circumferentialwise against the bottom of the groove but said length being substantially less than the arcuate length of the ring body between middle and end protrusions whereby the ring body is free to deform as aforesaid.

2. An open-ended external retaining ring adapted to be sprung into a seating groove provided in a shaft, pin and the like, and to provide an artificial shaft or pin shoulder, comprising a substantially closed ring body having outer and inner circular edges which are eccentrically disposed so that the section height of the ring body decreases progressively from its middle portion towards its free ends whereby the ring body is adapted to maintain circularity under deformation, and protrusions extending inwardly of said inner edge at only the free ends and the middle portion of the ring body, the inner circular edges of said protrusions being formed as arcs of a circle which is concentric with the outer circular edge of the ring body and which is of slightly less diameter than that of the bottom circle of the groove in which it is adapted to be sprung, and said arcs having appreciable length so as to exert a firm pressure grip circumferentialwise against the bottom of the groove but said length being substantially less than the arcuate length of the ring body between middle and end protrusions whereby the ring body is free to deform as aforesaid.

3. An open-ended external retaining ring as set forth in claim 1, wherein the protrusions at the free ends of the ring are provided with apertures adapted for the reception of the working points of a ring handling tool.

4. An open-ended external retaining ring as set forth in claim 2, wherein the protrusions at the free ends of the ring are provided with apertures adapted for the reception of the working points of a ring handling tool.

5. An open-ended external retaining ring adapted to be sprung into a seating groove provided in a shaft, pin and the like, and to provide an artificial shaft or pin shoulder, comprising a subtsantially closed ring body having a continuous outer circular edge throughout its full arcuate length, inward protrusions at both the free ends and at the middle part only of the ring body, said protrusions extending from the inner edge of the ring and being formed with arcuate inner edges which lie on a circle which is concentric with the outer edge of the ring body and which have appreciable arcuate length so as to exert a firm pressure grip circumferentialwise against the bottom of the groove, the inner edges of the ring between said protrusions extending along arcs of a circle which is eccentric to the outer circular edge of the ring so that the section height of the ring body decreases from its middle portion toward the free ends thereof, whereby the ring body is adapted to maintain circularity under deformation, and the length of said arcs being substantially greater than the arcuate length of the inner edges of the protrusions whereby the ring body is free to deform as aforesaid.

6. An open-ended external retaining ring as set forth in claim 5, wherein the diameter of the circle on which the inner edges of the protrusions lie is slightly less than the diameter of the bottom of the groove in which the ring is to be sprung.

7. An open-ended external retaining ring as set forth in claim 5, wherein the protrusions at the free ends of the ring body are provided with apertures adapted to receive the working points of a ring handling tool.

HEINRICH HEIMANN.

REFERENCES CITED

The following references are of record in the file of this patent:

UNITED STATES PATENTS

| Number | Name | Date |
|---|---|---|
| 2,382,947 | Brozek | Aug. 14, 1945 |
| 2,382,948 | Brozek | Aug. 14, 1945 |
| 2,411,761 | Stolberg | Nov. 26, 1946 |